Patented Feb. 5, 1952

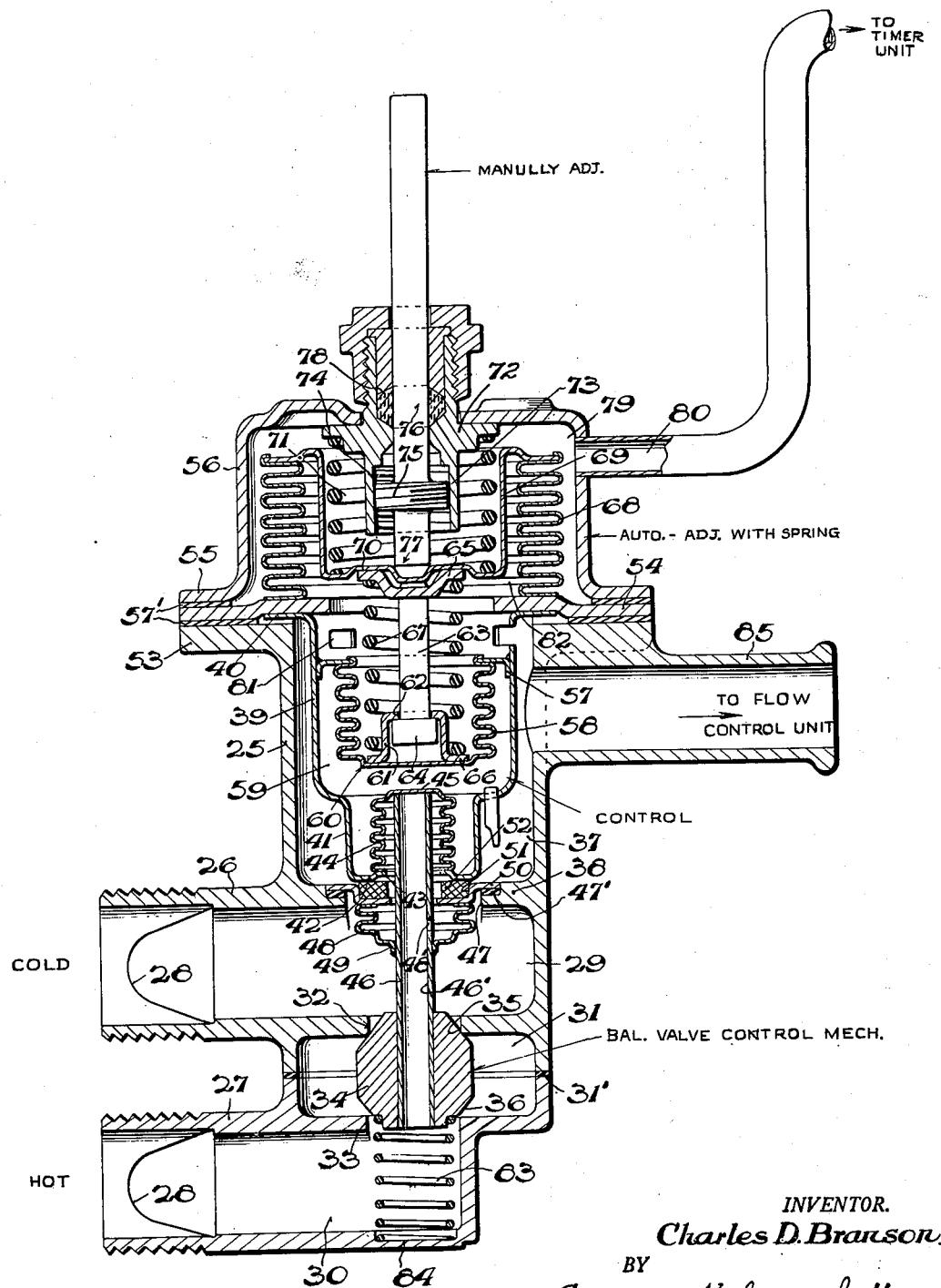

2,584,417

UNITED STATES PATENT OFFICE 2,584,417

MIXING VALVE

Charles D. Branson, Knoxville, Tenn., assignor to Robertshaw-Fulton Controls Company, Knoxville, Tenn., a corporation of Delaware Original application November 27, 1946, Serial No. 712,643. Divided and this application February 20, 1948, Serial No. 9,795

8 Claims. (Cl. 236—12)

1

This invention relates to mixing valves, and more particularly to mixing valves for effecting desired intermixtures of hot and cold water, although as will be apparent to those skilled in the art the invention as to at least some of its aspects is susceptible of wider application. This application is a division of my application Serial No. 712,643, filed November 27, 1946, for Hydraulic Controls for Automatic Washing Machines.

It is an object of this invention to provide an improved mixing valve which may be readily set so as to predetermine the temperature of the mixture effected thereby.

Another object of this invention is to provide an improved mixing valve which can be operated at predetermined times to adjust the valve so that fluid can be delivered at a lower temperature for predetermined periods.

Another object of this invention is to provide an improved mixing valve wherein the valve is balanced against variations in and differences between the pressures of the fluids being mixed.

Another object of this invention is to provide an improved mixing valve which assures against injury to the parts if the temperature should rise after the valve has reached a limit position.

Another object of this invention is to provide an improved mixing valve which is of relatively simple construction, composed of parts that are readily fabricated and assembled, and certain and efficient in operation.

Other objects will appear as the description of the invention proceeds.

The invention is capable of receiving a variety of mechanical expressions only one of which has been illustrated on the accompanying drawings, but it is to be expressly understood that the drawings are for purposes of illustration only, and are not to be construed as a definition of the limits of the invention, reference being had to the appended claims for that purpose.

Referring in detail to the accompanying drawings, an axial section is shown through one construction of mixing valve embodying the present invention.

In the form shown said valve includes a casing 25 of any suitable size, construction and material provided with inlet nipples 26 and 27 respectively connected in any suitable way to cold and hot water pipes. Each of these inlet nipples is preferably provided with a filter 28 to prevent scale or other foreign matter from entering the mixture. Any suitable sources of cold and hot water may be connected with said nipples 26 and 27 respectively, as the cold water main of the building and the building's system for supplying hot water to various outlets, as conventionally provided. Nipples 26 and 27 lead to cold and hot water chambers 29 and 30 respectively, and said chambers in turn communicate with an intermediate mixing chamber 31 through ports 32 and 33 respectively, provided in any suitable way, but here shown as merely apertures formed in the walls dividing the chambers 29 and 30 from the chamber 31, although suitable members providing ported valve seats may be provided in said apertures if preferred. To facilitate manufacture the portion of the casing including the chamber 30 may be made separate from the portion containing the chamber 29 and the two portions connected in any suitable way, with or without interposed packing, as shown at 31'. Disposed in the chamber 31 for cooperation with the valve ports 32 and 33 is a balanced valve member 34 of any suitable construction but here shown as provided at its opposite extremities with beveled seating faces 35 and 36 respectively adapted to cooperate with the ports 32 and 33 for proportioning the flow of hot and cold water into the mixing chamber 31. Mixing chamber 31 communicates through any suitable passage or passages (not shown) and formed in the casing 25 leading to a thermostat chamber 37 separated from the cold water chamber 29 by a partition 38.

Disposed in chamber 37 is a thermostat of any suitable construction but preferably having an external cup-shaped wall 39 having a flanged open end 40 and here shown as also reduced in diameter at its opposite end 41. End wall 42 of said cup-shaped wall 39 is provided with an aperture at 43, and hermetically sealed to said end wall around said aperture is an expansible and collapsible corrugated tubular wall or bellows 44. The movable end wall 45 of said bellows 44 has attached thereto in any suitable way a hollow valve stem 46 which passes through the aperture 43 and to which the valve member 34 is attached in any suitable way. The passage 46' through said stem opens at one end into chamber 30 but its opposite end is closed by movable end wall 45. Partition 38 has an aperture 47 therein through which said valve stem extends, and a flexible wall shown as an expansible and collapsible corrugated tubular wall or bellows 48 has one end secured in any suitable way to the valve stem 46, as shown at 49, while its opposite end is secured in any suitable way to a flanged plate 50 mounted in a seat surrounding said aperture 47 with interposed packing as shown at 47'.

As shown, said flanged plate 50 is formed to provide a seat 51 in which is carried a yieldable annular pad 52 against which the end wall 42 of the thermostat is seated when its flange 40 is mounted on or adjacent the flange 53 of the casing 25, in which position it is secured in any suitable way, as by an annular plate 54 that is in turn held in position by the flange 55 of a bonnet member 56 hereinafter described. Packing 57' may be interposed between the members 53, 54 and 55 as illustrated, and said members may be connected together in any suitable way, as by bolts and nuts, screws, etc., which have been omitted from the drawing in the interest of simplicity. With the parts assembled as shown annular plate 54 presses on the flange 40 of the thermostat, and hence end wall 42 of the thermostat presses pad 52 onto its seat 51 and thereby presses flanged plate 50 against packing 47' so that all leakage of water between chambers 29 and 37 is prevented. Bellows 48 has the same effective area as valve port 32 so that variations in the cold water pressure are balanced out. On the other hand, the chamber inside of the communicating bellows 44 and 48 is in communication with the passage 46', as through one or more apertures 48', so that bellows 48 is subjected on its opposite sides to the pressures of the hot and cold water. Thereby valve member 34 is balanced against pressure variations in and pressure differences between the hot and cold water.

Spaced from the flange 40 of the cup-shaped wall 39 is an interior flanged member 57 secured to the wall 39 in any suitable way, and attached to the inner periphery of said flanged member 57 is an expansible and collapsible corrugated tubular wall or bellows 58 which extends into the chamber 59 of the thermostat. The inner side of the opposite and movable end wall 60 of said bellows 58 is engaged by but unattached to a cup-shaped member 61 having an aperture 62. Extending through said aperture 62 to slide therein is a post 63 having a head 64, while the opposite end of said post has attached thereto in any suitable way a flange 65 providing a spring seat. A coil spring 67 extends between the flange 66 on said cup-shaped member 61 and spring seat 65. Spring 67 normally holds the cup-shaped member 61 in engagement with the head 64 or the movable end wall 60, but if the pressure in chamber 59 continues to increase after valve member 34 has engaged its seat at port 33, the bellows 58 may contract, lifting member 61 against the tension of spring 67, the cup-shaped member 61 sliding on post 63. The depth of the depression in member 61 is such that the head 64 will not be engaged by wall 60 under the maximum displacement contemplated.

Attached to the annular plate 54 in any suitable way is one end of an expansible and collapsible corrugated tubular wall or bellows 68 whose opposite end is formed as or attached in any suitable way to a reentrant cup-shaped movable wall 69. The end wall 70 of cup-shaped wall 69 engages the flanged member 65 heretofore referred to, and a coil spring 71 reacts between said bottom wall 70 and a stationary member 72 formed by or carried on the end wall of the bonnet member 56 heretofore referred to. Member 72 as shown has an inwardly extending tubular portion 73 having internal threads 74, and mounted for rectilinear movement in said portion 73 is the threaded enlargement 75 of a stem 76 which has its inner end 77 extending into contact with the end wall 70 of cup-shaped member 69. Stem 70 is here shown as provided with a packing gland 78 which may be of any suitable construction or, if preferred, a packless construction may be employed instead. Stem 76 extends outwardly to any suitable distance where it is provided with any suitable mechanism for rotating and thereby moving the stem in the direction of its axis. The mechanism for moving the stem 76 in the direction of its axis may be associated with any suitable indicating means calibrated in temperature so that by reference thereto the operator will be able to set the temperature of the mixture as desired within the range provided, as will appear from the ensuing description.

The chamber 79 within the bonnet member 56 is in communication with a pipe or other suitable conduit 80 leading to any suitable source of pressure fluid for a purpose to be explained. The cup-shaped wall 39 is provided with one or more apertures 81 in the area between the flanged member 57 and the flange 40 so as to provide a means of communication between the chamber 82 interiorly of the bellows 68 and the chamber 37. Thereby the pressure of the water in the chamber 37 is transmitted to the chamber 82 where it acts on cup-shaped member 69 attached to the movable end of bellows 68 to hold end wall 70 in contact with the end 77 of stem 76. The valve member 34 is preferably urged toward its seat at port 32 by a suitable spring 83, here shown as a coil spring reacting between the valve member 34 and a suitable valve seat 84 provided in the wall of the hot water chamber 30. The chamber 59 heretofore referred to in the thermostat is charged with any suitable thermosensitive fluid, the same being preferably filled with a suitable thermosensitive liquid. Chamber 37 has a suitable outlet nipple 85 leading therefrom and through which the mixture of hot and cold water flows from the thermostat chamber 37.

Explaining the operation of the mixing valve as so far described, cold and hot water flow respectively into the chambers 29 and 30, and assuming that the valve member 34 is in an intermediate position, the cold and hot water flow through the ports 32 and 33 respectively to the mixing chamber 31. From chamber 31 the mixed cold and hot water flows into the chamber 37 where it is in intimate heat interchanging relationship with the exterior wall 39, 41 of the thermostat. If desired, any suitable baffling means may be provided in chamber 37 to assure flow of the mixture into intimate contact with the thermostat. Thence the mixture flows from the chamber 37 through the outlet 85.

Assuming a predetermined setting for the thermostat as hereinafter explained, if the temperature of the mixture rises above the predetermined temperature the thermosensitive fluid in chamber 59 expands to contract bellows 44, bellows 58 with its spring 67 being so constructed as to afford greater opposition to movement under the pressure in the chamber 59 than bellows 44 with its spring 83. Contraction of bellows 44 causes the valve stem 46 to move downwardly as viewed in the drawings, decreasing the flow through port 33 but increasing the flow through port 32 so as to restore the temperature of the mixture to its predetermined degree. Conversely, if the temperature of the mixture drops below the predetermined temperature the thermosensitive fluid in chamber 39 contracts, the spring 83 acts through the valve member 34 and stem 46 to expand the bellows 44, moving the valve member 34 to decrease the flow of cold water through the port 32 and increase the flow of hot water through the port 33. If the temperature of the mixture causes the thermostat to engage valve member 34 with its seat at port 33, further expansion of chamber 59 by compression of bellows 44 is prevented, and if for any reason the temperature of the mixture should rise thereafter to increase the pressure in chamber 59, this pressure acting on the movable end wall 60 of bellows 58 will lift the cup-shaped member 61, against the tension of the spring 67, off of the head 64 until such time as the temperature decreases sufficiently to permit the spring 67 to restore engagement between the cup-shaped member 61 and head 64. The apertures 81 permit free circulation of the liquid between the chamber 37 and the chamber 82 interiorly of bellows 68, so that the latter chamber is full of liquid at the same pressure as the liquid in the chamber 37. Thereby the movable wall 70 is held by the water pressure against the end 77 of stem 76, spring 71 being of such strength that it yields to assure this engagement.

The mixing valve may also be readily set to maintain the desired temperature of the mixture. To this end the stem 76 as heretofore explained is manually settable by any suitable mechanism so as to adjust it in the direction of its axis. If stem 76 is moved downwardly as viewed in the drawings the end wall 70 of cup-shaped member 69 is moved downwardly, moving the post 63, cup-shaped member 61 and spring 67, which act as a unit, downwardly and expanding the bellows 58 by action against its movable end wall 60. This tends to contract the chamber 59, but as the chamber 59 is preferably full of a thermosensitive liquid the pressure is transmitted to the movable end wall 45 of bellows 44 causing the valve member 34 to move downwardly so as to decrease the flow of hot water through port 33 and increase the flow of cold water through port 32, thereby maintaining a lower temperature of the mixture because valve member 34 will close port 33 when a lower temperature of the mixture has been reached. Conversely, movement of the stem 76 upwardly as viewed in the drawings will cause valve member 34 to approach the port 32 so that a higher temperature will be maintained because valve member 34 will not close its port 33 until a higher temperature has been reached. Thereby, by a simple manual manipulation of the stem 76, the temperature of the mixture may be nicely predetermined.

In certain uses to which a mixing valve is put it is desirable to change the temperature of the water flowing through the outlet 85 for predetermined periods of time or under predetermined conditions. Thus in the case of a washing machine there are one or more periods during the automatic cycle of operation during which, in the interest of conserving hot water, colder water should be admitted to the tub for rinsing purposes. To avoid the necessity of a separate cold water line leading to the tub with a separate automatically actuated valve for admitting rinse water to the tub, the mixing valve as so far described may be used to perform the operation of admitting rinse water. To obtain an adjustment of the mixing valve to deliver the fluid at a lower temperature, fluid under pressure from any suitable source is admitted to chamber 79 through pipe 80, the control of the initiation of said admission, its duration and termination, as well as the magnitude of the pressure developed in the chamber 79, being under the control of any suitable device (not shown) associated with the conduit 80.

Assuming that water at the pressure of the main is used as the pressure fluid, water under pressure is admitted to the chamber 79 through pipe 80. Bellows 68 is now subjected on its opposite sides to the pressure of the water so that spring 71 is free to expand. This contracts the bellows 68 moving the end 70 of cup-shaped member 69 away from the inner end 77 of the stem 76 and transmitting its movement through flange 65, post 63 and spring 67, which act as a unit, to the movable end wall 60 of the bellows 58. As the chamber 59 is full of liquid, pressure is transmitted therethrough to the movable end wall 45 of bellows 44, whereby the valve member 34 is moved downwardly as viewed in this figure to its extreme position as determined by the engagement of the movable wall 70 with the plate 54. Thereby the water flowing out of the chamber 37 is kept at the lowest temperature of the available range, and as is apparent this position, if preferred, could be one in which the hot water port 33 is entirely closed. As long as the pressure is maintained in chamber 37, the colder water may thus flow through the outlet 85. Therefore, chamber 79 with its expansible and collapsible wall 68 functions as a fluid-pressure motor for operating the mixing valve to provide a delivery of water at a predetermined lower temperature.

It will therefore be perceived that the present invention provides an improved mixing valve which may be readily set to predetermine accurately the temperature of the mixture, which can be operated to deliver fluid at a lower temperature for desired times or on the occurrence of predetermined conditions, which assures against injury to the parts if the temperature continues to increase after the valve has reached a limit position, which is not responsive to variations in and differences between the pressures of the fluids being mixed, which is composed of simple, easily fabricated and assembled parts, and which is certain and efficient in operation.

While the embodiment of the invention illustrated on the drawing has been described with considerable particularity it is to be expressly understood that the invention is not limited thereto, as the same is capable of receiving a variety of expressions, as will now be apparent to those skilled in the art, while changes can be made in the details of construction, arrangement and proportion of parts, etc., parts may be replaced by equivalent parts, etc., without departing from the spirit of this invention. Reference is therefore to be had to the appended claims for a definition of the limits of the invention.

What is claimed is:

1. A mixing valve including a mixing chamber, a plurality of passages respectively having ports communicating with said mixing chamber, valve means cooperating with said ports for proportioning the flow of fluid therethrough, a thermostat chamber, a thermostat in said chamber subjected to the temperature of the mixture, said thermostat including an expansible and collapsible chamber defined by a rigid wall and a pair of expansible and collapsible members each attached at one end to said rigid wall, means operatively connecting the movable end of one of said members to said valve means, manually operable means cooperable with the movable end of said other member for applying pressure to said expansible and compressible chamber, means cooperable with the movable end of said other member for applying pressure to said expansible and collapsible chamber independently of said manually operable means, said last named means including an expansible and collapsible chamber having a movable end wall, means interiorly of said last named chamber and engaging therewith for expanding and collapsing said chamber, and means in communication with said thermostat chamber for applying the pressure of the mixed fluid to the opposite face of said movable end wall for normally urging the same into contact with said interior means.

2. A mixing valve including a mixing chamber, a plurality of passages respectively having ports communicating with said mixing chamber, valve means cooperating with said ports for proportioning the flow of fluid therethrough, a thermostat chamber, a thermostat in said chamber subjected to the temperature of the mixture, a stem operatively connecting said thermostat with said valve means and extending through an opening in the wall of one of said passages, and a flexible member operatively connected to said stem and to the wall surrounding said opening and in opposition to the port leading from said last named passage, said flexible member and said last named port having the same effective area whereby said valve means is balanced with respect to fluctuations in the pressure of the fluid flowing through said last named passage.

3. A mixing valve including a mixing chamber, a plurality of passages respectively having ports communicating with said mixing chamber, valve means cooperating with said ports for proportioning the flow of fluid therethrough, a thermostat chamber, a thermostat in said chamber subjected to the temperature of the mixture, a stem operatively connecting said thermostat with said valve means and extending through an opening in the wall of one of said passages, and a flexible member operatively connected to said stem and to the wall surrounding said opening and subjected to the pressure in said passage, and means for transmitting pressure in the other of said passages to the opposite side of said flexible member whereby said valve means is balanced with respect to differences in pressure in the fluids controlled by said valve means.

4. A mixing valve including a mixing chamber, a plurality of passages respectively having ports communicating with said mixing chamber, valve means cooperating with said ports for proportioning the flow of fluid therethrough, a thermostat chamber, a thermostat in said chamber subjected to the temperature of the mixture, a stem operatively connecting said thermostat with said valve means and extending through an opening in the wall of one of said passages, and a flexible member operatively connected to said stem and to the wall surrounding said opening and in opposition to the port leading from said last named passage, said flexible member being subjected to the pressure in said last named passage and said flexible member and said port having the same effective area, and said stem having a conduit communicating with the other of said passages and the opposite face of said flexible member whereby said valve means is balanced with respect to variations in pressure in and between the fluids controlled by said valve means.

5. A mixing valve including a mixing chamber, a plurality of passages for conveying fluids to be mixed to said chamber, valve means for proportioning the respective flows of said fluids, a thermostat comprising an expansible and collapsible chamber filled with a liquid and operatively connected to said valve means, means for applying pressure to the liquid in said chamber to adjust said valve means, a chamber in which said thermostat is subjected to the temperature of the mixed fluid, a pressure motor operatively related to said thermostat and cooperable therewith for applying pressure to the liquid in said expansible and collapsible chamber for moving said valve means to a predetermined position independently of said means, said pressure motor including an expansible and collapsible chamber having a movable end wall, means operatively connected to said movable end wall and to said thermostat for transmitting the pressure in said pressure motor to the liquid in said expansible and collapsible chamber, and a conduit in communication with said pressure motor expansible and collapsible chamber through which fluid pressure is applied thereto.

6. A mixing valve including a mixing chamber, a plurality of passages for conveying fluids to be mixed to said chamber, valve means for proportioning the respective flows of said fluids, a thermostat operatively connected to said valve means, a chamber in which said thermostat is subjected to the temperature of the mixed fluid, a pressure motor operatively related to said thermostat and cooperating therewith for moving said valve means to a predetermined position, said pressure motor including an expansible and collapsible chamber having a movable end wall, a spring associated with one side of said movable end wall for urging the same in one direction, means providing a chamber in communication with said thermostat chamber for applying the pressure therein to the opposite side of said movable end wall, a conduit in communication with said expansible and collapsible chamber for supplying fluid pressure thereto to oppose said last named pressure and render said movable end wall subject to the action of said spring, means operatively connected to said movable end wall and to said thermostat for transmitting the pressure of said spring to said thermostat, and adjustable means cooperable with said one side of said movable end wall to limit movement thereof when said movable end wall is subject to the influence of said last named pressure.

7. A mixing valve including a mixing chamber, a plurality of passages for conveying fluid to be mixed to said chamber, valve means for proportioning the respective flows of said fluids, a thermostat including a rigid wall and a pair of bellows each having one end fixed to said rigid wall to provide therewith an expansible and collapsible chamber, said chamber being filled with thermosensitive liquid, a chamber in which said thermostat is subjected to the temperature of the mixed fluid, means operatively connecting the movable end of one of said bellows to said valve means, a pressure motor including an expansible and collapsible chamber having a movable end wall, a spring associated with said movable end wall and tending to move the same toward said thermostat, means providing a chamber in communication with said thermostat chamber for applying the pressure therein to the opposite face of said movable end wall in opposition to said spring, conduit means in communication with said pressure motor expansible and collapsible chamber for supplying pressure to said chamber in opposition to said last named pressure and thereby render said movable end wall subject to the action of said spring, means operatively connected to said movable end wall and to the movable end of the other of said bellows for transmitting pressure through the liquid in said thermostat to move said valve means, and adjustable means cooperable with said movable end wall for limiting movement thereof against the bias of said spring.

8. A mixing valve including a mixing chamber, a plurality of passages respectively having ports communicating with said mixing chamber, valve means cooperating with said ports for proportioning the flow of fluid therethrough, a thermostat, a chamber in which said thermostat is subjected to the temperature of the mixture, said thermostat including an expansible and collapsible chamber defined by a rigid wall and a pair of expansible and collapsible members each attached at one end to said rigid wall, one of said members having its movable end operatively connected to said valve means, manually operable means cooperable with the movable end of said other member for adjusting said thermostat over a preselected range to variously position said valve means with respect to said ports, fluid pressure operable means cooperable with the movable end of said other member for moving said movable end independently of said manually operable means to move said valve means to a predetermined position, resilient means for operatively connecting said manually operable means and said fluid pressure operable means with said movable end of said other member, said resilient means being of a strength to prevent movement of said last named movable end as long as said first named movable end can respond to increased pressure in said expansible and collapsible chamber, said resilient means being compressible together with said other member if the pressure in said expansible and collapsible chamber rises after said member connected with said valve means becomes unresponsive to increased pressure in said thermostat.

CHARLES D. BRANSON.

REFERENCES CITED

The following references are of record in the file of this patent:

UNITED STATES PATENTS

| Number | Name | Date |
|---|---|---|
| 1,925,530 | Gotthardt | Sept. 5, 1933 |
| 2,205,334 | Barnes | June 18, 1940 |
| 2,335,761 | Hultman | Nov. 30, 1943 |
| 2,444,631 | Chace | July 6, 1948 |
| 2,489,896 | Kempton | Nov. 29, 1949 |